(12) United States Patent  
Tsuchie

(10) Patent No.: US 8,495,445 B2  
(45) Date of Patent: Jul. 23, 2013

(54) RADIO COMMUNICATION APPARATUS AND METHOD

(75) Inventor: Koji Tsuchie, Fujisawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1846 days.

(21) Appl. No.: 11/447,116

(22) Filed: Jun. 6, 2006

(65) Prior Publication Data

US 2006/0279656 A1 Dec. 14, 2006

(30) Foreign Application Priority Data

Jun. 7, 2005 (JP) ................................. 2005-167208

(51) Int. Cl.
*H04L 1/00* (2006.01)
*G06F 7/02* (2006.01)

(52) U.S. Cl.
USPC ............................ 714/747; 714/819; 714/821

(58) Field of Classification Search
USPC .......................................... 714/747, 819, 821
See application file for complete search history.

(56) References Cited

U.S. PATENT DOCUMENTS

| | | | | |
|---|---|---|---|---|
| 4,939,694 A | * | 7/1990 | Eaton et al. ................... | 365/200 |
| 5,021,947 A | * | 6/1991 | Campbell et al. ............... | 712/25 |
| 5,579,502 A | * | 11/1996 | Konishi et al. ................. | 711/103 |
| 6,115,394 A | * | 9/2000 | Balachandran et al. ...... | 370/477 |
| 6,331,829 B2 | * | 12/2001 | Kawai ............................. | 341/94 |
| 6,836,514 B2 | * | 12/2004 | Gandhi et al. ........... | 375/240.27 |
| 6,876,676 B2 | * | 4/2005 | Watanabe et al. ............. | 370/522 |
| 6,940,856 B2 | * | 9/2005 | Vu ................................. | 370/390 |
| 6,952,432 B2 | * | 10/2005 | Watanabe et al. ............. | 370/522 |
| 6,959,018 B2 | * | 10/2005 | Watanabe et al. ............. | 370/522 |
| 6,961,354 B2 | * | 11/2005 | Watanabe et al. ............. | 370/522 |
| 7,002,998 B2 | * | 2/2006 | Watanabe et al. ............. | 370/522 |
| 7,002,999 B2 | * | 2/2006 | Watanabe et al. ............. | 370/522 |
| 7,010,003 B2 | * | 3/2006 | Watanabe et al. ............. | 370/522 |

(Continued)

FOREIGN PATENT DOCUMENTS

JP 7-143100 6/1995
JP 07143100 A * 6/1995

(Continued)

OTHER PUBLICATIONS

John Thompson, et al., "An Integrated 802.11a Baseband and MAC Processor", IEEE International Solid-State Circuits Conference Digest of Techincal Papers, Feb. 5, 2002, 3 pages.

(Continued)

*Primary Examiner* — Joseph D Torres
(74) *Attorney, Agent, or Firm* — Oblon, Spivak, McClelland, Maier & Neustadt, L.L.P.

(57) ABSTRACT

There is provided with an apparatus including: a receiving section which receives a frame including an error detection code from a network; an error detecting section which performs error detection on the frame received by the receiving section based on the error detection code; a data storage which stores data in a predetermined field of the frame as replacement data in a case where an error is not detected in the frame; a data selecting section which selects the replacement data from the data storage in a case where an error is detected in the frame; and a frame generating section which generates a frame in which data in the predetermined field of the frame is replaced with the replacement data selected by the data selecting section in the case where an error is detected in the frame; wherein the error detecting section performs error detection on the generated frame.

11 Claims, 11 Drawing Sheets

U.S. PATENT DOCUMENTS

| | | | |
|---|---|---|---|
| 7,039,851 B2 * | 5/2006 | Wang et al. | 714/776 |
| 7,058,973 B1 * | 6/2006 | Sultan | 726/12 |
| 7,266,118 B2 * | 9/2007 | Ido et al. | 370/389 |
| 7,269,170 B2 * | 9/2007 | Watanabe et al. | 370/389 |

FOREIGN PATENT DOCUMENTS

| | | |
|---|---|---|
| JP | 2000-224226 | 8/2000 |
| JP | 2002-26741 | 1/2002 |
| JP | 2002-374228 | 12/2002 |
| JP | 2002374228 A * | 12/2002 |
| JP | 2005-130277 | 5/2005 |
| WO | WO 00/01174 | 1/2000 |

OTHER PUBLICATIONS

Phillip Ryan, et al., "A Single Chip PHY COFDM Modem for IEEE 802.11a with Integrated ADCs and DACs", IEEE International Solid-State Circuits Conference Digest of Technical Papers, Feb. 7, 2001, 3 pages.

Daji Qiao, "Goodput Analysis and Link Adaptation for IEEE 802.11a Wireless LANs", IEEE Transactions on Mobile Computing, vol. 1, No. 4, Oct.-Dec. 2002, pp. 178-292.

Office Action issued Aug. 31, 2010, in Japanese Patent Application No. 2005-167208.

* cited by examiner

RADIO COMMUNICATION APPARATUS AND METHOD

CROSS-REFERENCE TO RELATED APPLICATIONS

This application is based upon and claims the benefit of priority from the prior Japanese Patent Applications No. 2005-167208 filed on Jun. 7, 2005, the entire contents of which are incorporated herein by reference.

BACKGROUND OF THE INVENTION

1. Field of the Invention

The present invention relates to a radio communication apparatus and a radio communication method.

2. Related Art

A receiving unit of a conventional wireless LAN apparatus uses an error correction code and an error detection code to control frame errors. An error correction code adds appropriate redundancy to information (a message) to be transmitted to a receiving end. Errors that occur in a communication channel are corrected at the receiving end on the basis of the error correction code. An error detection code adds appropriate redundancy to a message. Errors that occur in a communication channel are detected at a receiving end on the basis of the error detection code.

A receiving unit of a conventional wireless LAN apparatus includes an antenna section, a demodulating section, an error correcting section, an error detecting section, and a retransmission control section.

Data received at the antenna section is decoded by the demodulating section and error correction is performed by the error correcting section on the basis of an error correction code added at a transmitting device. The error detecting section performs error detection on the basis of the error detection code added at the transmitting device. If not all errors can be corrected at the error correcting section, errors are detected at the error detecting section. In that case, the retransmission control section performs retransmission control. Some method is used to cause the other end of communication to retransmit the data.

For example, a wireless LAN apparatus requests the transmitting end to retransmit a frame in which an error has occurred, by not returning an Ack (Acknowledgement) frame to the transmitting end. Conversely, if the apparatus properly receives a frame transmitted to it, it returns an Ack frame to the transmitting end.

Consider a situation in which a first terminal transmits a data frame to a second terminal and the second terminal that has received the data frame returns an Ack frame to the first terminal.

Suppose the Ack frame transmitted from the second terminal to the first terminal includes an error even though the second terminal has received correct data frame without errors from the first terminal. If an Ack frame cannot be correctly received, the effect is as if no Ack frame were transmitted. In this case, the data frame will be retransmitted in accordance with the mechanism of retransmission control.

An Ack frame is typically a short frame that only includes minimum information such as a frame type and a destination address. Therefore the most part of the information in the frame is known or can be estimated before its reception. In terms of the communication quality and power consumption of radio communication systems, it is not beneficial to determine only on the basis of the mechanism of error correction and error detection that a frame is an error frame, and to request retransmission of the frame.

SUMMARY OF THE INVENTION

According to an aspect of the present invention, there is provided with a radio communication apparatus comprising: a receiving section which receives a frame including an error detection code from a network; an error detecting section which performs error detection on the frame received by the receiving section based on the error detection code; a data storage which stores data in a predetermined field of the frame as replacement data in a case where an error is not detected in the frame; a data selecting section which selects the replacement data from the data storage in a case where an error is detected in the frame; and a frame generating section which generates a frame in which data in the predetermined field of the frame is replaced with the replacement data selected by the data selecting section in the case where an error is detected in the frame; wherein the error detecting section performs error detection on the generated frame.

According to an aspect of the present invention, there is provided with a radio communication apparatus comprising: a receiving section which receives a frame including an error detection code from a network; an error detecting section which performs error detection on the frame received by the receiving section on the basis of the error detection code; a data detecting section which detects in a frame, in which an error is detected by the error detecting section, bit data sandwiched between two particular patterns in each of which a bit pattern is repeated a predetermined number of times; and a frame generating section which generates a frame in which the bit data sandwiched between the two particular patterns is replaced with one or more repetition of the predetermined bit pattern, which has the same bit length as that of the bit data; wherein the error detecting section performs error detection on the generated frame.

According to an aspect of the present invention, there is provided with a radio communication method comprising: receiving a frame including an error detection code from a network; performing error detection on the frame received, based on the error detection code; storing data in a predetermined field of the frame in a table as replacement data in a case where an error is not detected in the frame; selecting the replacement data from the table in a case where an error is detected in the frame; generating a frame in which data in the predetermined field of the frame is replaced with the selected replacement data in the case where an error is detected in the frame; and performing error detection on the generated frame.

DETAILED DESCRIPTION OF THE INVENTION

Figure 1:
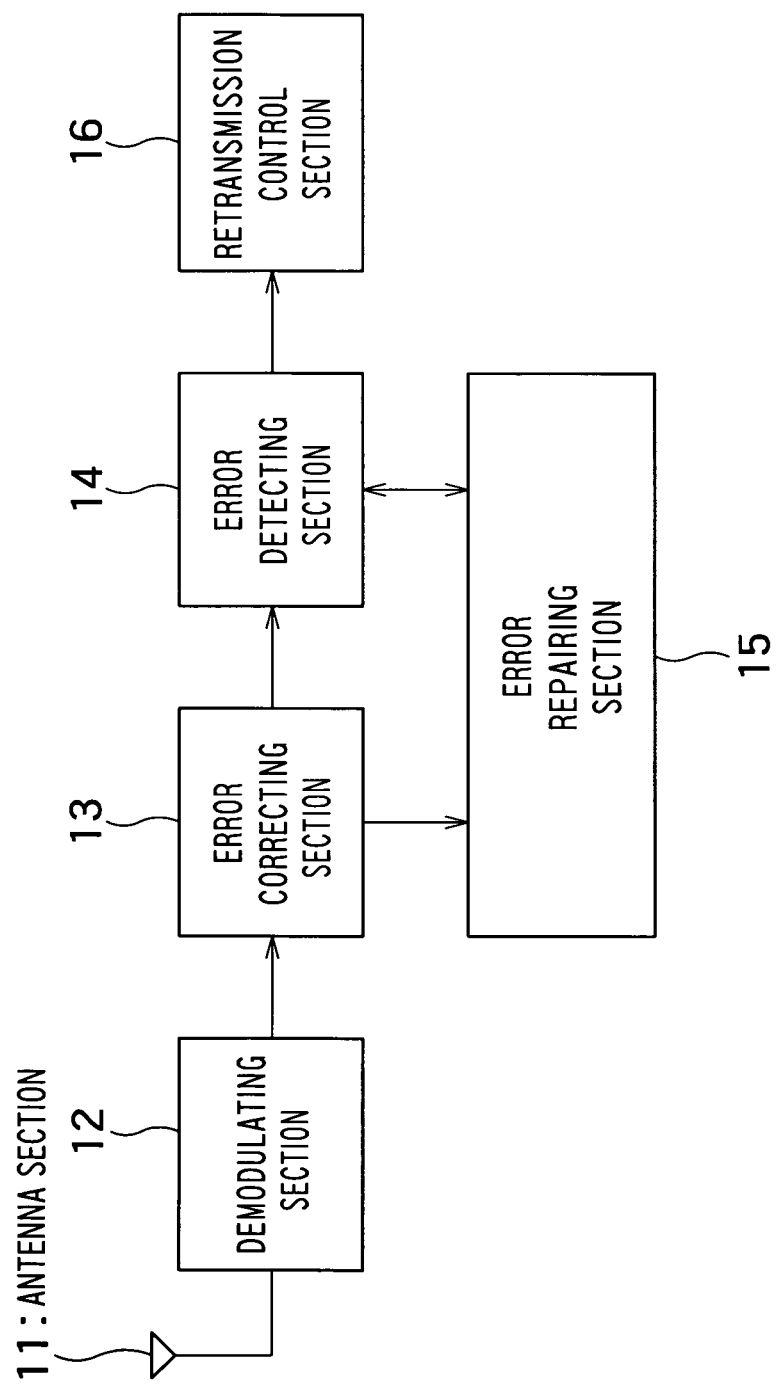
FIG. 1 is a block diagram showing a receiving unit in a radio communication apparatus according to an embodiment of the present invention.

FIG. 1 is a block diagram showing a receiving unit in a radio communication apparatus according to an embodiment of the present invention.

The radio communication apparatus belongs to a communication area of a radio base station, for example, and communicates with other radio communication apparatuses that belong to the communication area by radio through the radio base station. A network such as a BSS (Basic Service Set) is formed by the radio base station and the radio communication apparatuses. A network identifier (network address) such as a BBSID is assigned to the network. The receiving unit in FIG. 1 that is included in the radio communication apparatus will be described below.

Figure 2:
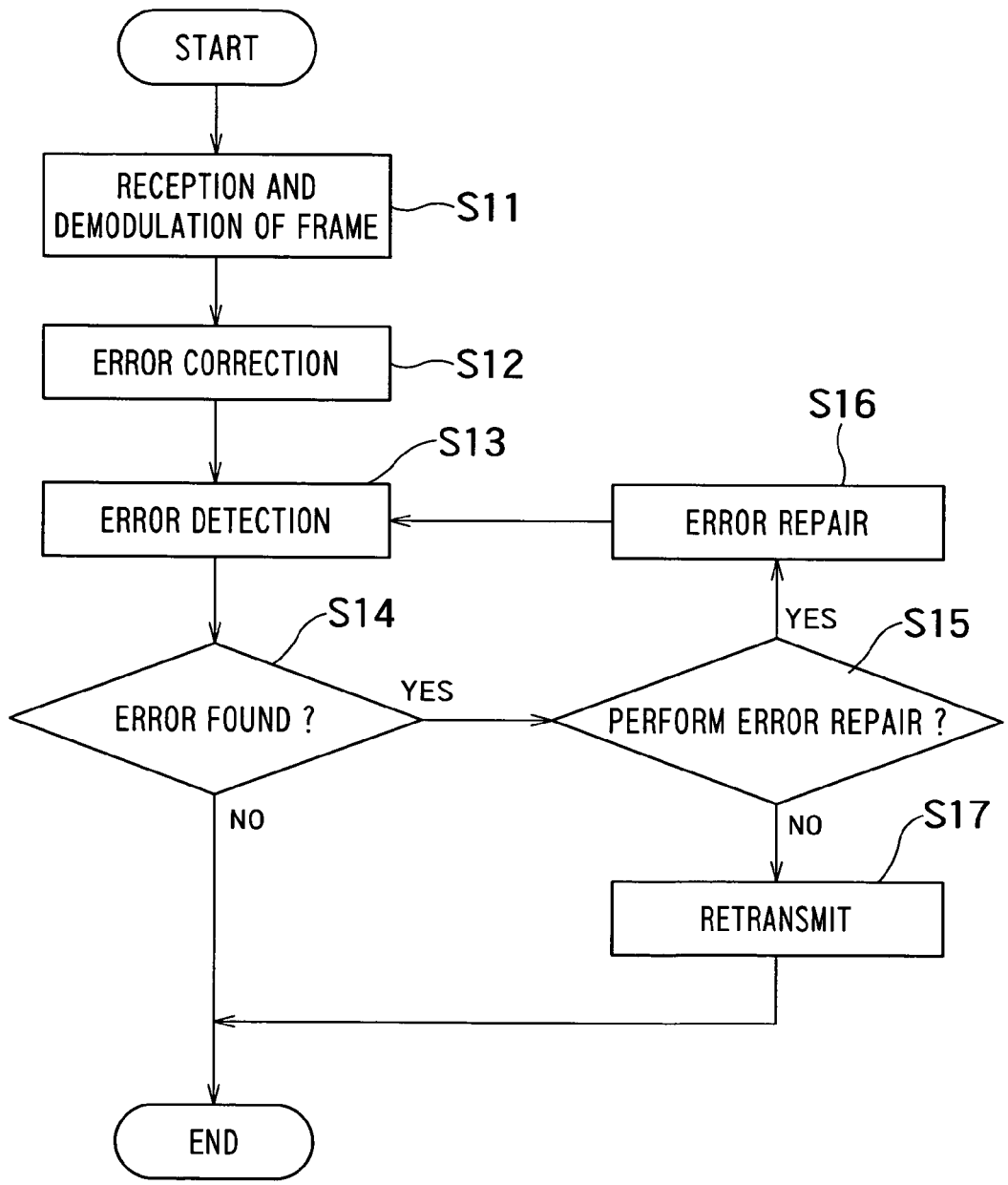
FIG. 2 is a flowchart showing a flow of a receiving process performed by the receiving unit shown in FIG. 1.

FIG. 2 is a flowchart showing a flow of a receiving process performed by the receiving unit shown in FIG. 1. An antenna section 11 in the receiving unit receives frames transmitted from another radio communication apparatus (S11) and a demodulating section 12 demodulates the frames received by the antenna section 11 (S11). The demodulating section 12 performs demodulation, for example, OFDM demodulation and QPSK, QAM, or BPSK demodulation.

An error correcting section 13 performs error correction on a demodulated frame (S12). The error correcting section 13 performs, for example, Reed-Solomon decoding and Viterbi decoding as error correction.

An error detecting section 14 performs error detection on the basis of an error detection code contained in the frame error-corrected (S13). Examples of the error detection code include CRC (Cyclic Redundancy Check).

If an error is detected in the frame by the error detecting section 14 (S14: YES), an error repairing section 15 performs error repair on the frame in which an error is detected (S15: YES, S16). In the error repair processing, a portion of the frame is replaced with known information obtained beforehand. For example, a transmitter address (source address), receiver address (destination address) or some other data contained in the frame in which an error is detected is replaced with a terminal address (including the terminal address of this radio communication apparatus) on the same network that has been obtained beforehand. The error repair processing will be detailed later.

The error detecting section 14 rechecks a frame that underwent the error repair processing, on the basis of an error detection code contained in this frame (S13). If an error is detected (S14: YES), then the error repairing section 15 performs error repair processing again (S15: YES, S16).

The error repair and error detection are continued until no error is detected, according to a predetermined scheme. If a predetermined termination condition is met before an error is eliminated from the frame (for example if all error repair patterns have been tried) (S15: NO), a retransmission control section 16 performs retransmission control (S17). For example, the retransmission control section 16 refrains from transmitting an Ack frame for the received frame, thereby causing the other radio communication apparatus to retransmit the frame.

On the other hand, if no error is detected in the frame immediately after error correction or if the error is eliminated as a result of the error repair processing (S14: NO), it means that the frame has been successfully received. Then the retransmission control section 16 performs an appropriate action such as returning an Ack frame for the received frame if the received frame is a data frame or transmitting the next data if the received frame is an Ack frame.

Figure 3:
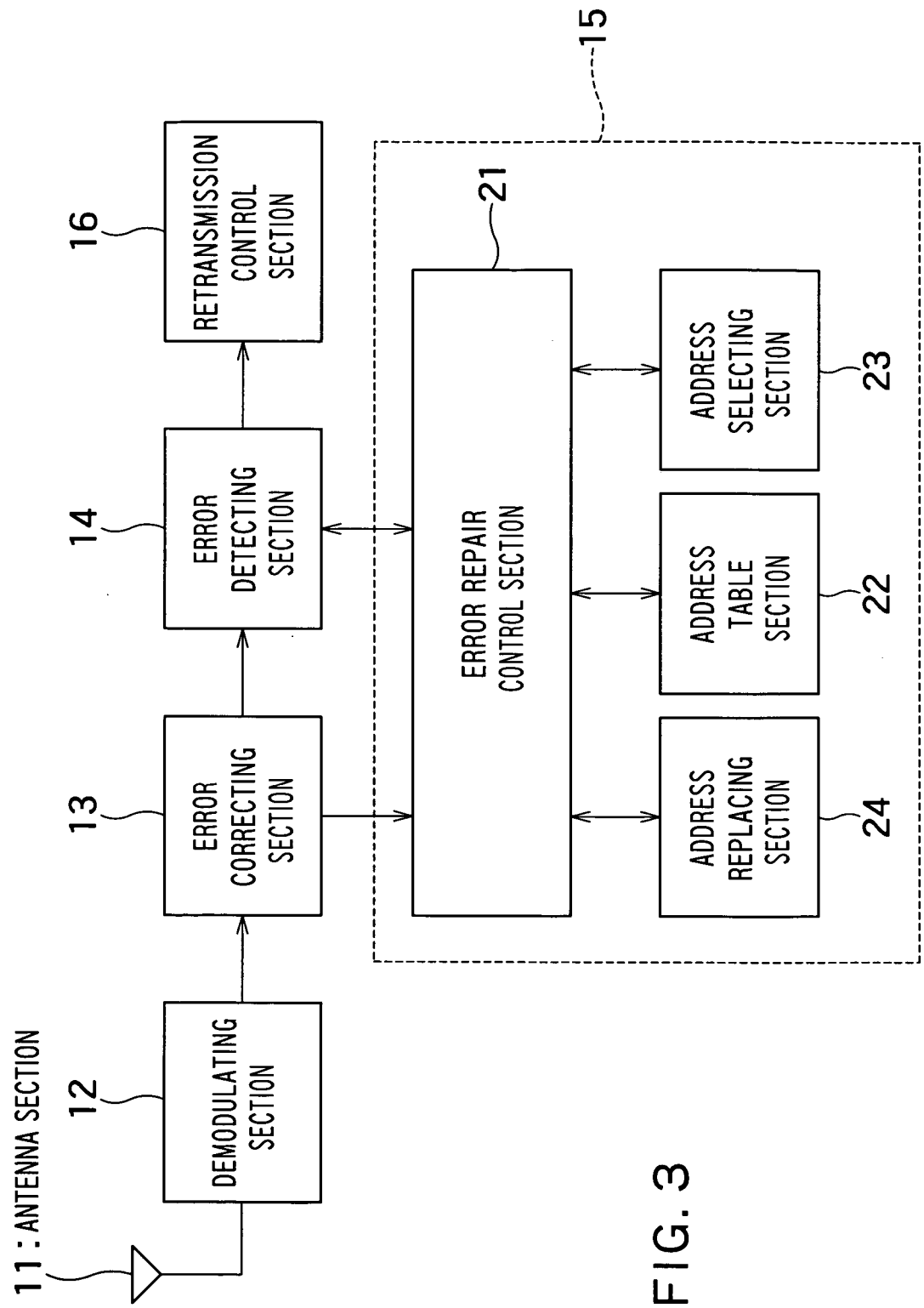
FIG. 3 is a block diagram of the receiving unit showing details of an error repairing section in FIG. 1.

The error repairing section 15 will be described below in further detail. FIG. 3 is a block diagram showing details of the error repairing section 15. The error repairing section 15 includes an error repair control section 21 which controls the entirety of the error repairing section 15, an address table section 22, an address selecting section 23, and an address replacing section 24. The address table section 22 corresponds, for example, to a data storage. The address replacing section 24 corresponds, for example, to a frame generating section. The address selecting section 23 corresponds, for example, to a data selecting section.

The address table section 22 manages a terminal address table which stores the addresses of terminals (for example MAC addresses) on the same network (for example in the same communication area). In particular, the address table section 22 detects a transmitter address and/or a receiver address in a transmitter address field and/or receiver address field in a frame judged by the error detecting section 14 as containing no error and registers the detected terminal address or addresses in the terminal address table. If a terminal address detected is already contained in the terminal address table, the address does not need to be registered.

If the size of the terminal address table is limited and the terminal addresses of all terminals cannot be registered in the terminal table, the terminal address table is preferably updated as needed. Such a situation may occur if a large number of terminals are on the same network.

Figure 4:
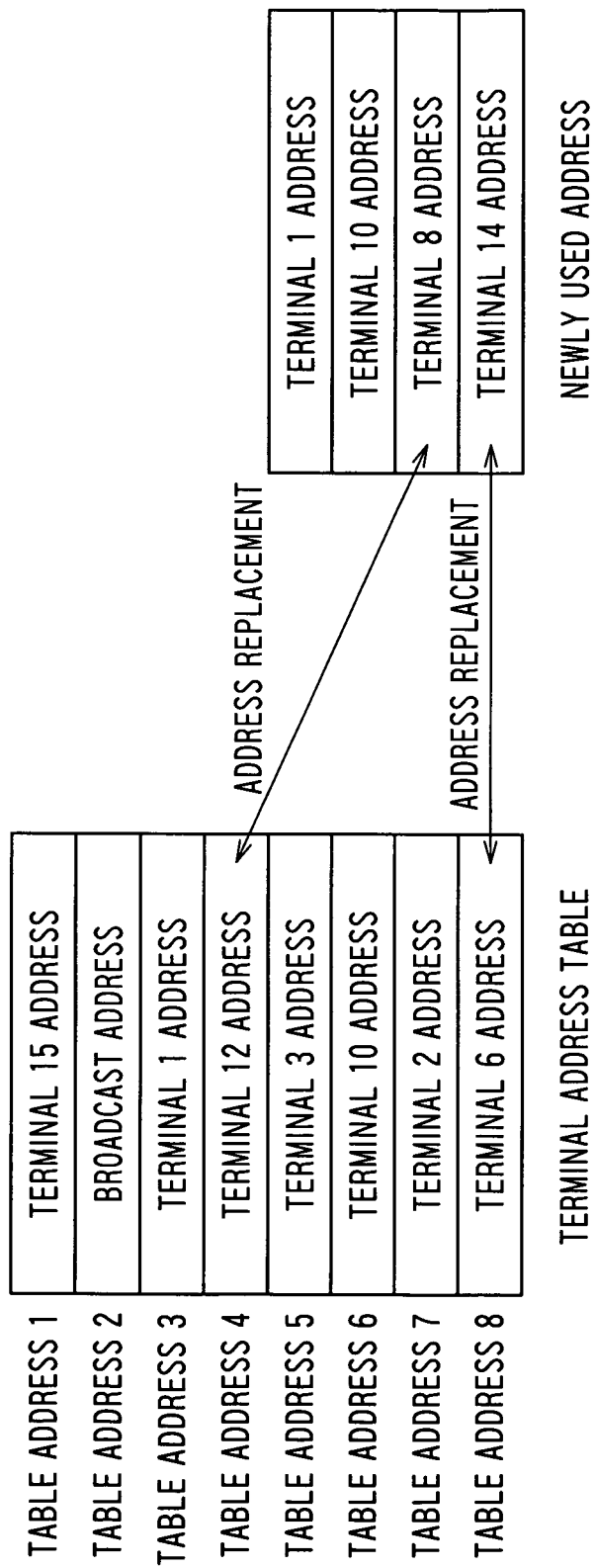
FIG. 4 is a diagram illustrating an exemplary method for updating a terminal address table.

FIG. 4 is a diagram illustrating an exemplary method for updating the terminal address table. In this example, the terminal address table has table addresses 1-8 and therefore can store up to 8 terminal addresses. At this point in time, the terminal addresses (including a broadcast address) shown are stored in table addresses 1-8.

Suppose, in this state, frame 1 and frame 2 have been properly received in this order. It is assumed here that the receiver address and transmitter address in frame 1 are terminal 14 address and terminal 8 address, respectively, and the receiver address and transmitter addresses in frame 2 are terminal 10 address and terminal 1 address, respectively.

If a receiver address and transmitter address in a frame received are not registered in the terminal table, the address table section 22 updates, for example, the oldest terminal addresses in the terminal address table with the receiver address and transmitter address contained in the frame.

In this example, the address table section 22 first updates terminal 6 address that is the oldest in the terminal address table with terminal 14 address contained in frame 1, then updates the second oldest terminal address 12 with terminal 8 address contained in frame 1. Terminal 10 address and terminal 1 address in frame 2 are already registered in the terminal address table and therefore update is not performed.

The address replacing section 24 replaces at least one of the receiver address and transmitter address in a received frame in which an error has been detected by the error detecting section 14 with a terminal address registered in the terminal address table.

Figure 5:
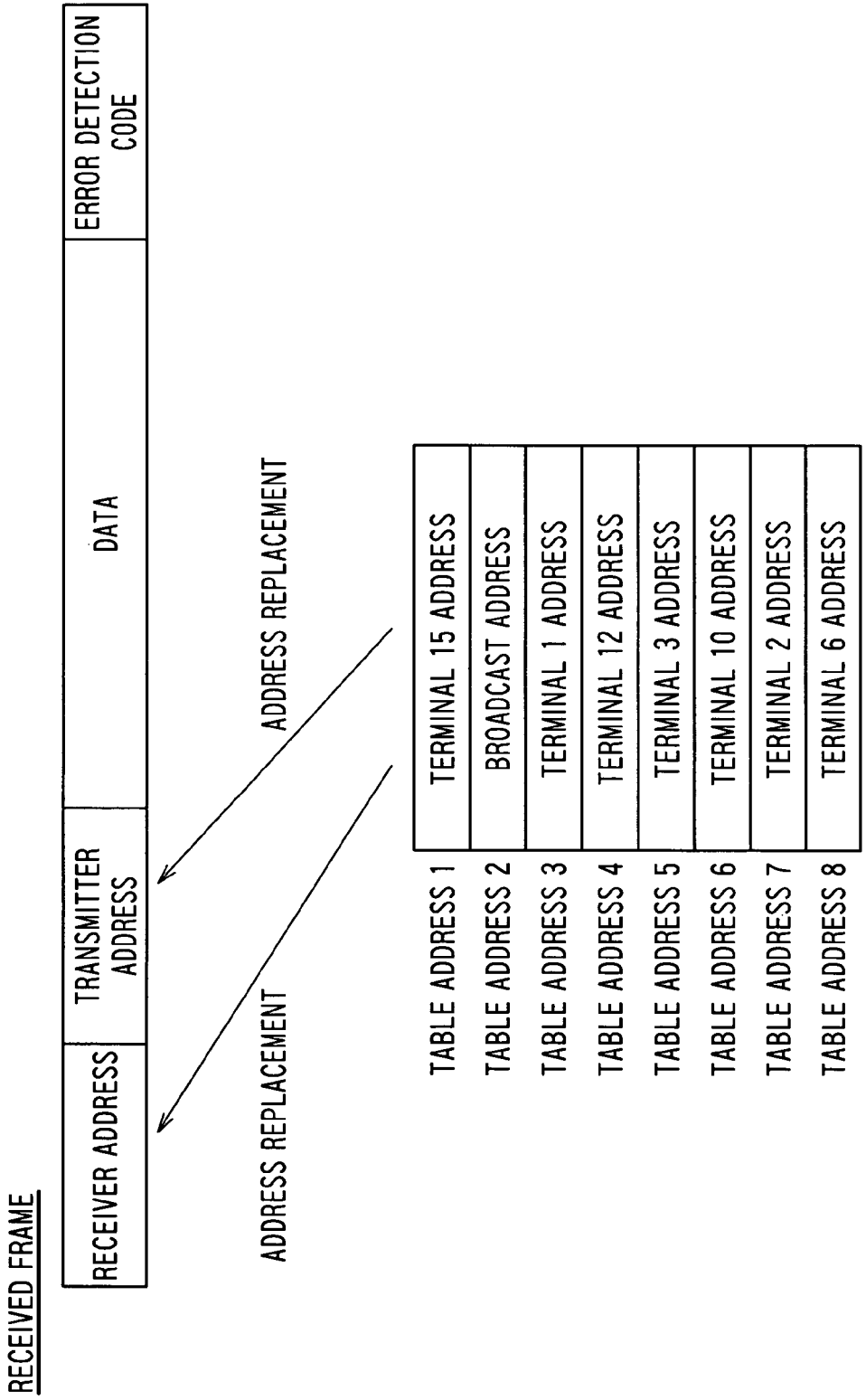
FIG. 5 is a diagram specifically illustrating terminal address replacement.

Terminal address replacement will be described below in detail. FIG. 5 is a diagram specifically illustrating terminal address replacement. The address replacing section 24 replaces the receiver address and/or transmitter address in a received frame in which an error has been detected with a terminal address registered in the terminal address table. The address selecting section 23 shown in FIG. 3 determines which of the terminal addresses registered in the terminal address table, the receiver address, and/or transmitter address in the received frame should be replaced with.

After the replacement, the error detecting section 14 rechecks the frame on the basis of an error detection code contained in the frame to determine whether it contains no error. If an error is detected, the address replacing section 24 continues replacement of the receiver address and/or transmitter address until no error is detected. Preferably, the address selecting section 23 selects a terminal address in such a manner that all possible combinations of a receiver address and a transmitter address can be tried.

For example, the receiver address contained in the received frame immediately after error correction by the error correcting section 13 is kept unchanged while only the transmitter address is replaced with one after another of the terminal addresses registered in the terminal address table. If an error cannot be eliminated by replacing the transmitter address with any of the terminal addresses registered in the terminal address table, then the receiver address is replaced with one of the terminal addresses in the terminal address table (for example with the terminal address at the top of the terminal address table) and then the transmitter address is again replaced with one after another of the terminal addresses as described above. If the error persists, the receiver address is replaced with another terminal address in the terminal address table (for example with the second terminal address from the top of the terminal address table) and then the transmitter address is again replaced with one after another of the terminal addresses. This process is repeated to try all possible combinations of a receiver address and a transmitter address. However, a combination in which the receiver address and transmitter address are identical or a combination in which the receiver address is an address other than the address of the own communication apparatus, a broadcast address, and a multicast address is unrealistic and therefore is preferably not selected in view of the efficiency of the processing.

Processing performed by the address table section 22, the address selecting section 23, and the address replacing section 24 has been described above, where the receiver address and transmitter address in a received frame are replaced. Moreover, data in other fields included in a frame can be treated in a similar manner. An example will be described with respect to a network address in a network address field (for example a BBS (Basic Service Set) ID).

Figure 6:
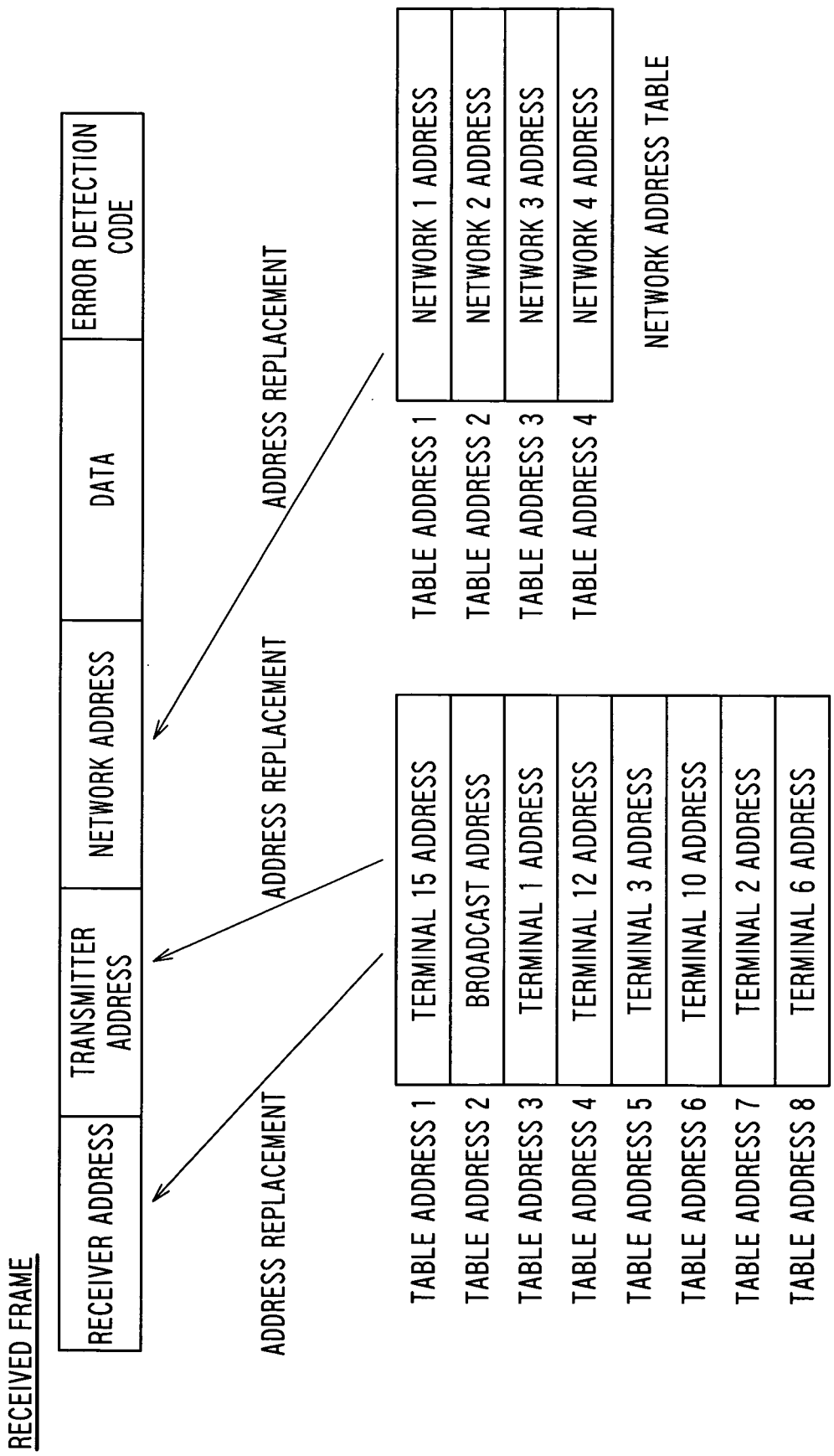
FIG. 6 is a diagram illustrating processing performed by an address table section, an address selecting section, and an address replacing section.

FIG. 6 shows a diagram explaining the case, where a network address is replaced.

The address table section 22 detects the network address in a frame judged by the error detecting section 14 as containing no error and, if the detected network address is not registered in a network address table, registers the detected network address in the network address table.

The address replacing section 24 replaces a network address in a received frame in which an error is detected by the error detecting section 14 with a network address registered in a network address table. The address selecting section 23 determines which of the network addresses registered in the network address table the network address in the frame received should be replaced with. The address selecting section 23 selects a network address on the basis of a predetermined selection condition.

After the replacement, the frame is rechecked by the error detecting section 14 to determine whether it contains no error. If an error is detected, replacement of the network address is continued until no error is found or all possible replacements are tried. The network address replacement can be combined with the receiver address and transmitter address replacement described above.

In the transmitter address and receiver address replacement process described earlier, transmitter addresses and receiver addresses are selected in such a manner that all possible combinations of a transmitter address and a receiver address are tried. However, this method is not efficient because processing load increases as the number of terminal addresses registered in the terminal address table increases. Another method will be described below in which terminal addresses are replaced more efficiently, that is, terminal addresses used for replacement are selected more efficiently.

Figure 7:
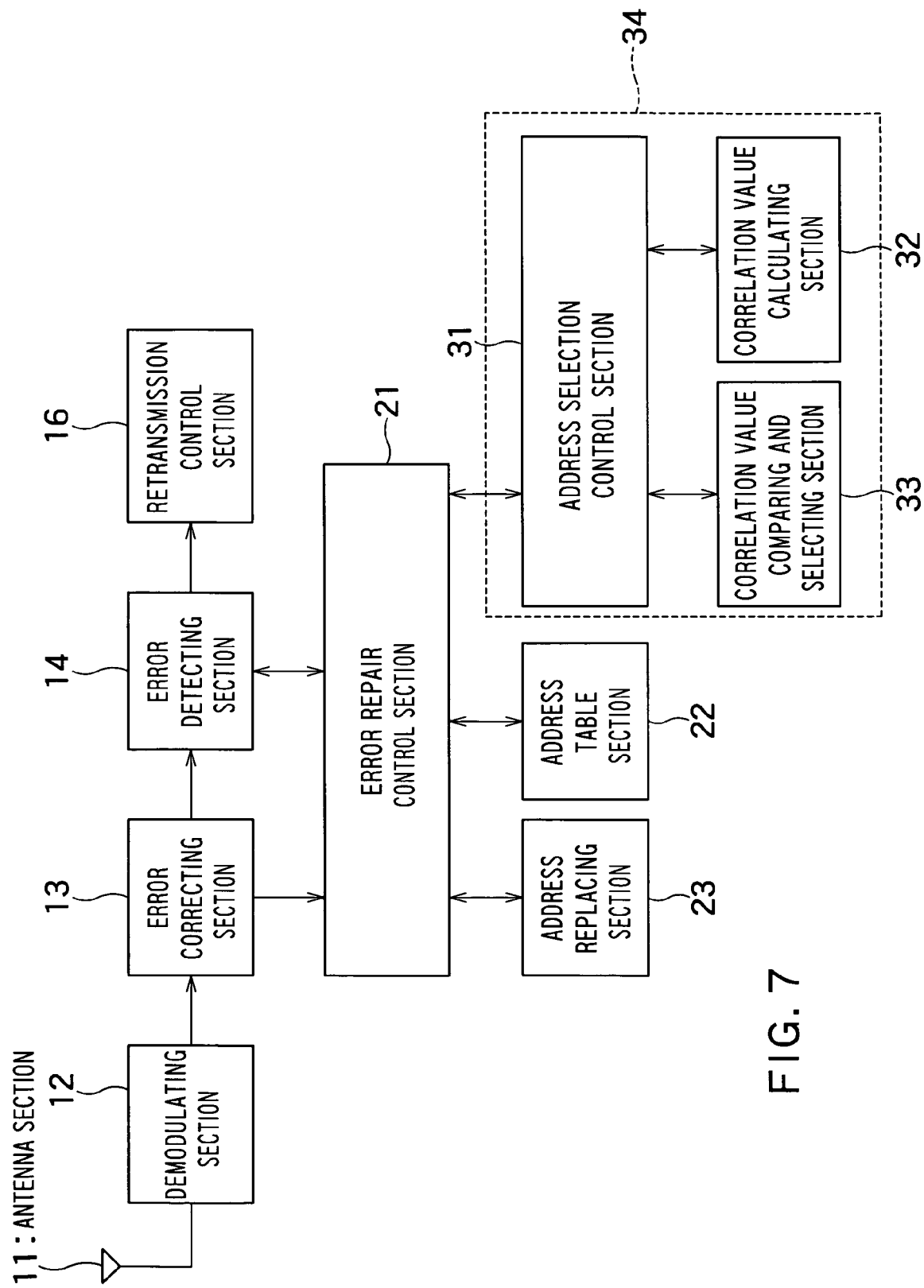
FIG. 7 is a block diagram showing a receiving unit including an address selecting section that efficiently selects a terminal address to be used for replacement.

FIG. 7 is a block diagram showing a receiving unit including an address selecting section that efficiently selects a terminal address to be used for replacement. The address selecting section 34 includes an address selection control section 31 that controls the entirety of the address selecting section 34, a correlation value calculating section 32, and a correlation value comparing and selecting section 33.

The correlation value calculating section 32 calculates a correlation value (an indicator of the degree of similarity) between a terminal address (receiver address or transmitter address) in a frame in which an error has been detected and each of the terminal addresses registered in a terminal address table. For example, the correlation value calculating section 32 calculates as the correlation value the number of matching bits between a terminal address in a received frame and terminal addresses registered in the terminal address table. Suppose that a terminal address has 128 bits, a terminal address in a received frame is " . . . 011", and a terminal address registered in the terminal address table is " . . . 101". The portion " . . ." is identical in both addresses. Because the number of matching bits is 126, the correlation value in this case is 126. The greater the correlation value, the more similar the addresses are.

The correlation value comparing and selecting section 33 compares the correlation value calculated by the correlation value calculating section 32 with a predetermined threshold value. If the correlation value is greater than or equal to the threshold value, the correlation value comparing and selecting section 33 transmits an instruction to replace the terminal address to the address replacing section 23 through the address selection control section 31. Alternatively, the correlation value comparing and selecting section 33 provides to the address replacing section 23 an instruction to replace the terminal address with a terminal address in the terminal address table in descending order of the correlation value calculated for each terminal address in the terminal address table.

In the forgoing description, a frame is repaired by replacing a terminal address or network address on a received frame. A frame can also be repaired as follows.

For example, the first bit in a field (for example a receiver address field) to be repaired is inverted and then error detection is performed. If an error is detected, the first bit is reinverted and the second bit is inverted, then error detection is performed again. If an error is detected again, the inverted bit is reinverted and the third bit is inverted, then error detection is performed again. This operation is repeated until the last bit in the field is reached. In this case, error detection may be performed only if the same data as bit-inverted field data is stored in the address table section 22. This enables efficient error repair processing.

As has been described, according to this embodiment of the present invention, data in a given field (for example, a receiver address field, a transmitter address field, or a network address field) in a frame in which an error is detected is replaced with data in the given field obtained from a frame properly received in the past. Thus, an error in the received frame can be efficiently repaired. As a result, the number of frame retransmissions can be reduced, leading to improvement of communication quality and reduction in power consumption.

Figure 8:
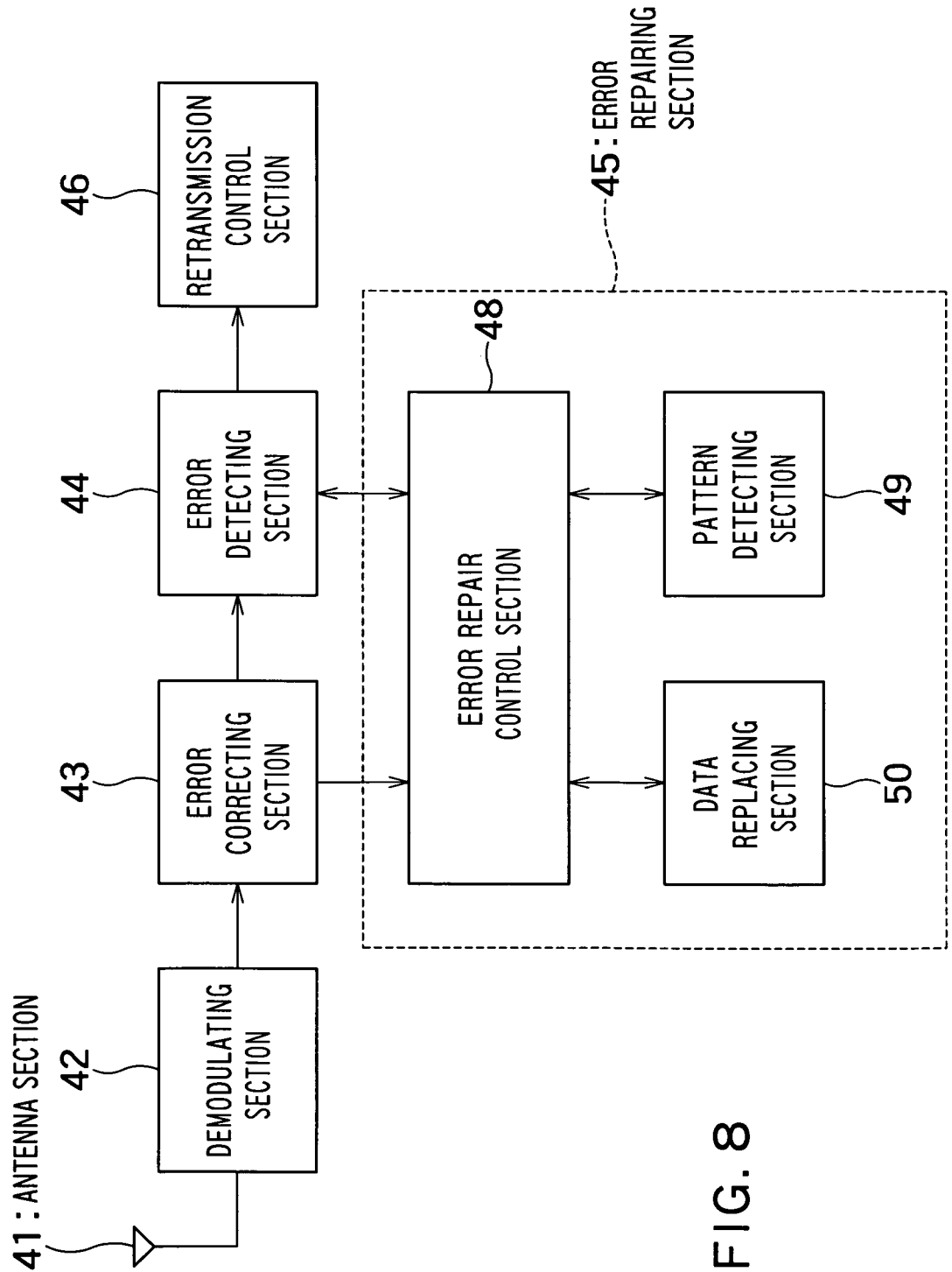
FIG. 8 is a block diagram showing a receiving unit in a radio communication apparatus according to an alternative embodiment.

FIG. 8 is a block diagram showing a receiving unit in a radio communication apparatus according to an alternative embodiment of the present invention.

After a frame received by an antenna section 41 is demodulated by a demodulating section 42, an error correcting section 43 performs error correction and then an error detecting section 44 performs error detection. If an error is detected in the error detection, error repair processing is performed at an error repairing section 45. If the error persists, a retransmission control section 46 performs processing for requesting the transmitting end to retransmit the frame. On the other hand, if no error is detected in the error detection, or an error is eliminated by the error repair processing, it means that the frame has been successfully received. Then, the retransmission control section 46 performs an appropriate action such as returning an Ack frame to the transmitting end if the received frame is a data frame, or transmits the next data if the received frame is an Ack frame. The error repairing section 45 will be described below in detail.

As shown in FIG. 8, the error repairing section 45 includes an error repair control section 48 which controls the entirety of the error repairing section 45, a pattern detecting section 49, and a data replacing section 50.

The pattern detecting section 49 detects in a received frame a particular pattern in which a predetermined bit pattern (for example 0 or 1) appears (is repeated) contiguously a predetermined number of times (for example "00 . . . 00" or "11 . . . 11"). Then, the pattern detecting section 49 checks whether there is data sandwiched between two particular patterns (for example data sandwiched between "00 . . . 00" and "00 . . . 00").

If there is data (bit data) sandwiched between two particular patterns, the data replacing section 50 replaces this data with the predetermined bit pattern or a sequence of the predetermined bit patterns, which has the same length as that of the data (for example, data of one or more bit between "00 . . . 00" and "00 . . . 00" is replaced with a "0" bit or a sequence of "0" bits).

Figure 9:
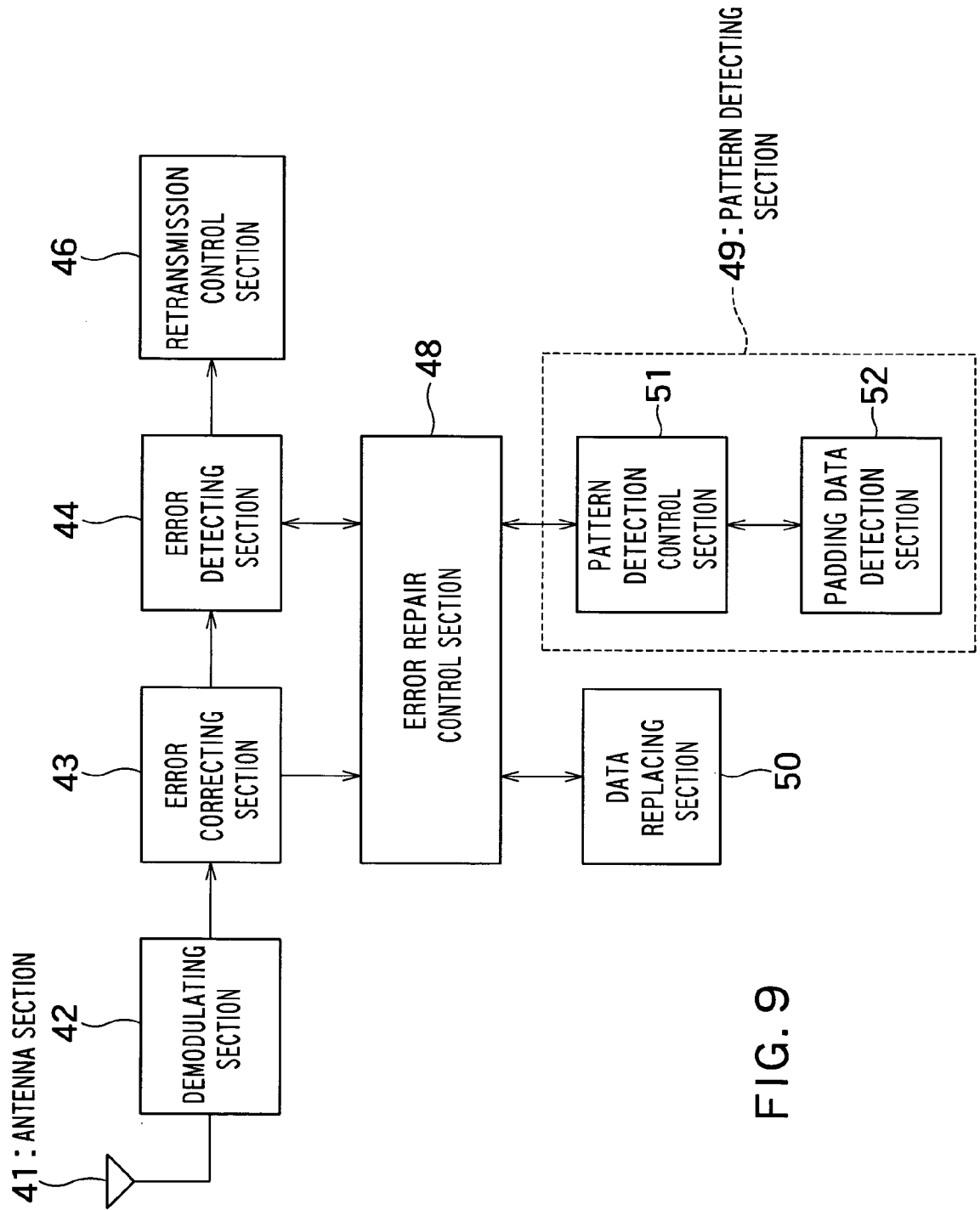
FIG. 9 is a block diagram of the receiving unit showing details of a pattern detecting section in FIG. 8.

FIG. 9 is a block diagram showing a more detailed configuration of the pattern detecting section 49.

The pattern detecting section 49 includes a pattern detection control section 51 which controls the entirety of the pattern detecting section 49 and a padding data detecting section 52.

Figure 10:
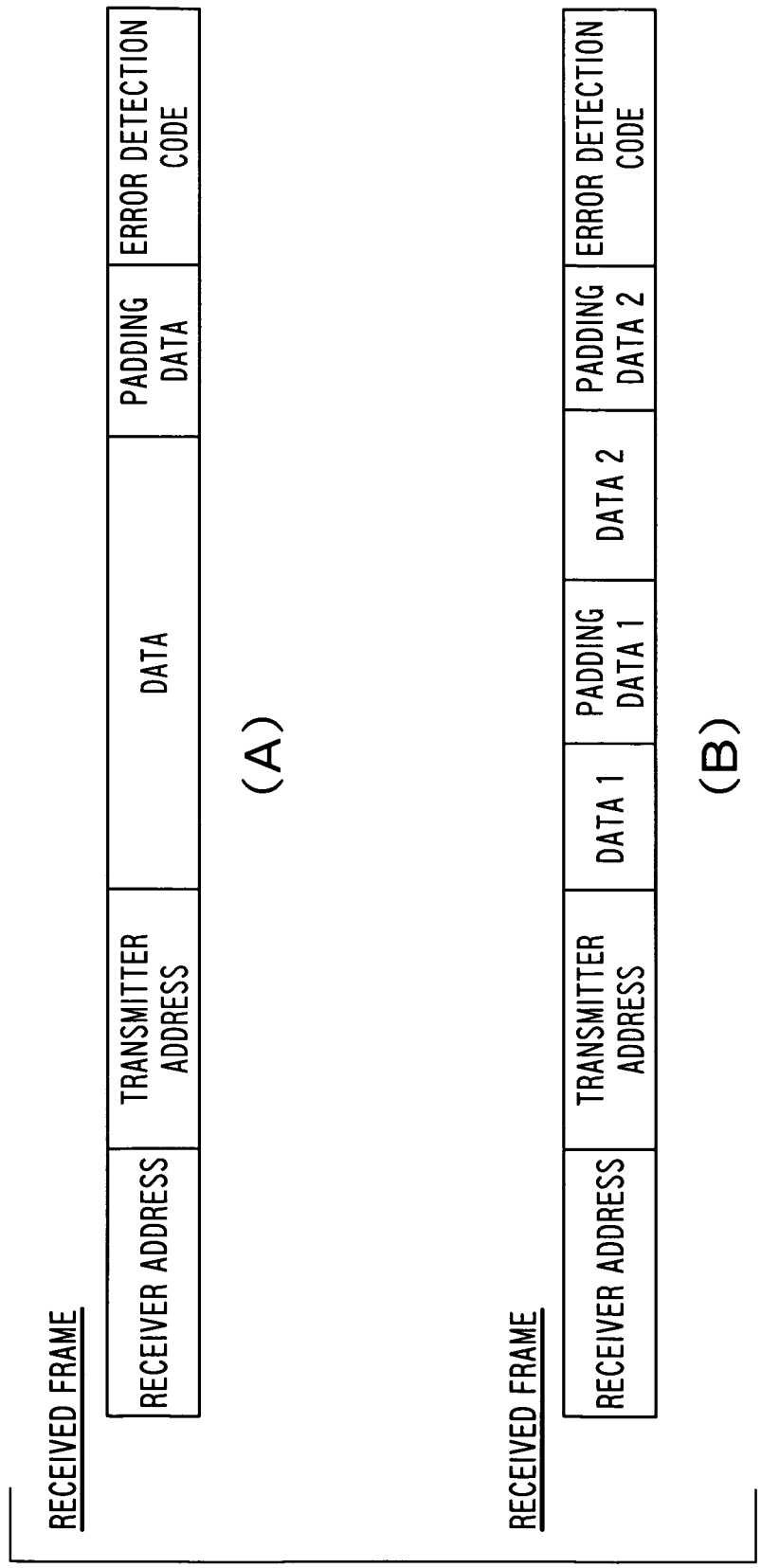
FIG. 10 shows exemplary received frames in which padding data is inserted.

In typical communication systems, dummy data called padding data is appended to actual data to be transmitted in order to fill a predetermined length of a transmission frame. FIGS. 10 (A) and 10 (B) show exemplary received frames in which padding data is inserted. FIG. 10 (A) shows one frame that contains one piece of user data; FIG. 10 (B) shows one frame that contains two pieces of user data. In many cases, contiguous 0s are used as padding data.

The padding data detecting section 52 stores a certain length of a sequence of 0s as the above particular pattern. Each of the 0s making up the particular pattern corresponds to the predetermined bit pattern mentioned above. The padding data detecting section 52 checks a received frame to determine whether the frame contains a bit or a bit string sandwiched between the particular patterns. If it does, the data replacing section 50 replaces the bit or the bit string with a "0" or a bit string of "0".

Figure 11:
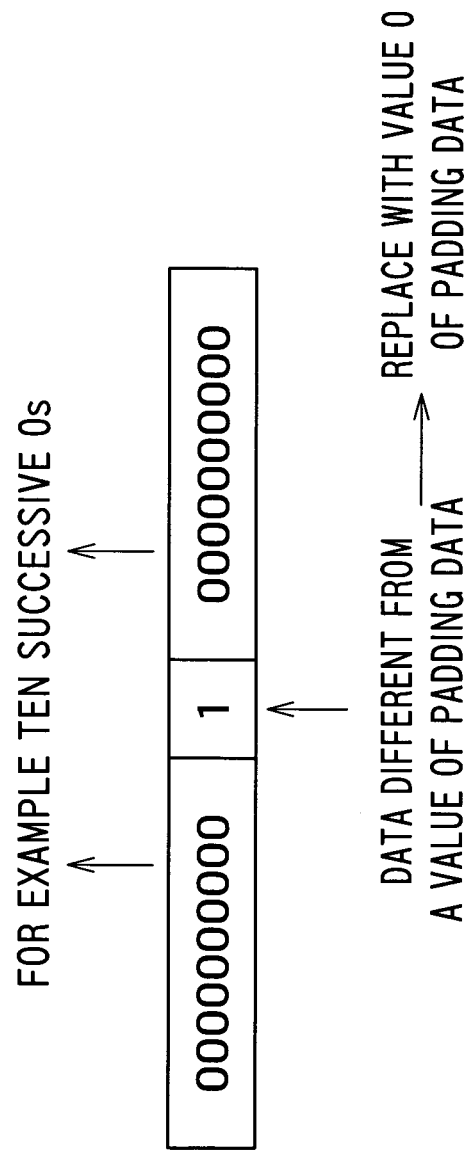
FIG. 11 shows an example in which a "1" between two particular patterns is replaced with the value "0" of the padding data.

FIG. 11 shows an example in which "1" sandwiched between particular patterns each having 10 contiguous 0s is replaced with the value "0" of the padding data. In this example, a single bit is sandwiched between the particular patterns. If multiple bits, for example "1011", are sandwiched between the particular patterns, that "1011" are replaced with "0000".

If multiple pieces of padding data are contained in one frame as shown in FIG. 10 (B) (two in this example), it is unrealistic to replace data between them. For example, it is unrealistic to replace data (for example data 2) between the particular pattern contained in padding data 1 and the particular pattern contained in padding data 2. Therefore, preferably the upper limit is set on the number of bits between particular patterns beyond which the bits are not replaced.

After the data between particular patterns is replaced with the value "0" of the padding data as described above, the resultant frame is rechecked at the error detecting section 44. If no error is detected, it is determined that the frame has been properly received.

While the particular pattern in the example in FIG. 11 is a sequence of 0s, it may be a sequence of 1s or may be a sequence of "10s". In the latter case, "10" corresponds to the above-mentioned predetermined bit pattern.

The alternative embodiment of the present invention described above can be combined with the embodiment of the present invention described earlier.

As has been described, according to the alternative embodiment of the present invention, the data sandwiched between particular patterns is replaced with a predetermined bit pattern or a sequence of the bit patterns. Thus, a received frame in which an error is detected can be efficiently repaired. Consequently, the number of retransmissions of frames can be reduced and, accordingly, communication quality can be improved and power consumption can be reduced. By combining the alternative embodiment of the present invention with the embodiment described earlier, these effects can be further improved.

What is claimed is:

1. A radio communication apparatus comprising:
   a receiving section which receives a frame including an error detection code from a network;
   an error detecting section which performs error detection on the frame received by the receiving section based on the error detection code;
   a data storage which stores data in a predetermined field of the frame as replacement data in a case where an error is not detected in the frame;
   a data selecting section which selects the replacement data from the data storage in a case where an error is detected in the frame; and
   a frame generating section which generates a generated frame in which data in the predetermined field of the frame is replaced with the replacement data selected by the data selecting section in the case where an error is detected in the frame;
   wherein the error detecting section performs error detection on the generated frame;

further comprising a correlation value calculating section which calculates a correlation value between data in the predetermined field of the frame in which an error is detected and the replacement data stored in the data storage, by calculating a degree of similarity in an address in the frame in which an error is detected and addresses in an address table,
wherein the data selecting section selects the replacement data on the basis of the calculated correlation value.

2. The apparatus according to claim 1, wherein the data in the predetermined field is a source address in a source address field.

3. The apparatus according to claim 1, wherein the data in the predetermined field is a destination address in a destination address field.

4. The apparatus according to claim 1, wherein the data selecting section selects one of a local address, a broadcast address, and a multicast address as the replacement data from the data storage.

5. The apparatus according to claim 1, wherein the data in the predetermined field is a network address in a network address field.

6. The apparatus according to claim 1, wherein the correlation value calculating section calculates the correlation value based on the number of matching bits between the data in the predetermined field and the replacement data.

7. The apparatus according to claim 1, wherein the data selecting section selects the replacement data having a correlation value more than or equal to a threshold value.

8. The radio communication apparatus according to claim 1, wherein:
the data selecting section selects another piece of replacement data from the data storage if an error still exists as a result of the error detection performed by the error detecting section;
the frame generating section generates the generated frame in which data in the predetermined field of the frame is replaced with another piece of replacement data selected by the data selecting section; and
the error detecting section again performs error detection on the generated frame.

9. The apparatus according to claim 8, further comprising a correlation value calculating section which calculates a correlation value between data in the predetermined field of the frame in which an error is detected and the replacement data stored in the data storage,
wherein the data selecting section selects the replacement data on the basis of the calculated correlation value.

10. The apparatus according to claim 9, wherein the data selecting section selects the replacement data from the data storage in descending order of the correlation value calculated for each replacement data in the data storage.

11. A radio communication method comprising:
receiving a frame including an error detection code from a network;
performing error detection on the frame received, based on the error detection code;
storing data in a predetermined field of the frame in a table as replacement data in a case where an error is not detected in the frame;
selecting the replacement data from the table in a case where an error is detected in the frame;
generating a generated frame in which data in the predetermined field of the frame is replaced with the selected replacement data in the case where an error is detected in the frame;
performing error detection on the generated frame;
calculating a correlation value between data in the predetermined field of the frame in which an error is detected and the replacement data stored in the data storage by calculating a degree of similarity in an address in the frame in which an error is detected and addresses in an address table; and
selecting the replacement data on the basis of the calculated correlation value.

* * * * *